Patented June 15, 1954

2,681,344

UNITED STATES PATENT OFFICE 2,681,344

COLORING MATTERS OF THE TETRA-AZA PORPHIN SERIES

Harold France, Blackley, Manchester, England, assignor to Imperial Chemical Industries Limited, a corporation of Great Britain No Drawing. Application January 3, 1951, Serial No. 204,287

Claims priority, application Great Britain January 12, 1950

9 Claims. (Cl. 260—314)

This invention relates to new colouring matters and more particularly to new colouring matters of the tetra-aza-porphin series.

It is well known that metal and metal-free phthalocyanines are valuable blue pigments of considerable technical importance and that by introducing into the phenylene nuclei of the phthalocyanine molecule certain substituents, for example chlorine, greener pigments can be obtained. However, no satisfactory preparations have hitherto been described of technically useful pigments of analogous structure but with shades redder than those of the phthalocyanines.

Attempts have already been made to synthesise compounds containing the simple tetra-aza-porphin system (also known as the porphyrazine system) by treating nitrogenous derivatives of acids of the maleic series, including maleic acids of the aliphatic and alicyclic series with metallic reagents under conditions which result in the formation of phthalocyanines from the corresponding derivatives of phthalic acid, but the only compounds containing the simple tetra-aza-porphin system whose synthesis from the corresponding maleic dinitrile which have yet been described are certain metal and metal-free octaphenyl-tetra-aza-porphins and their nuclear substituted derivatives obtained from diphenylmaleic dinitrile and certain of its nuclear substituted derivatives.

Diphenylmaleic dinitrile is especially suitable for the preparation of a tetra-aza-porphin because it is stable in the cis form and even at 300° C., there is no detectable conversion into the trans form, but the octaphenyl-tetra-aza-porphins are dull greenish pigments of no commercial interest.

Small yields of alkyl-substituted tetra-aza-porphins have however been obtained from certain pyrrole derivatives, for example by treating 3-methyl-4-ethylpyrrole with bromine in the presence of ammonia or by heating 3-methyl-4-ethylpyrrole-2:5-diisocyanate with pyridine and tetramethylammonium hydroxide, tetramethyl-tetraethyl-tetra-aza-porphin has been obtained and from this the corresponding iron, copper and magnesium derivatives have been formed.

Hitherto no tetra-aza-porphins have been described in which the pair of carbon atoms not attached to nitrogen in any of the fundamental pyrrole nuclei forms part of a 6-membered alicyclic ring. We have now found that such compounds are valuable pigments in that they have good fastness properties and they give bright shades which are redder than those of the corresponding phthalocyanines.

According to our invention therefore we provide as new coupling matters the metal and metal-free tetra-aza-porphins in which the pair of carbon atoms not attached to nitrogen in at least one of the fundamental pyrrole nuclei forms part of a 6-membered alicyclic ring.

By the fundamental pyrrole nuclei we mean the four pyrrole rings which are linked together through nitrogen atoms to form the tetra-aza-porphin structure.

The new tetra-aza-porphins of our invention in one of their possible tautomeric forms may be represented by the formula:

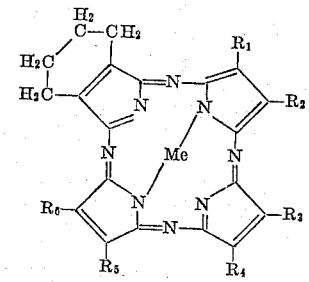

wherein Me represents a metal or, for the metal-free compounds, Me represents two atoms of hydrogen, the hydrogen atoms of the cycloalkyl ring may be replaced by substituents and $R_1$, $R_2$, $R_3$, $R_4$, $R_5$ and $R_6$ may be hydrogen atoms or hydrocarbon radicals or substituted hydrocarbon radicals, or any or all of the pairs of substituents $R_1$ and $R_2$, $R_3$ and $R_4$, $R_5$ and $R_6$ may be joined together to form an alicyclic, aromatic or quinonoid ring.

The new compounds of our invention are reddish-blue to violet colouring matters of high tinctorial strength and good fastness to light. They can be readily dispersed for more effective use by milling or grinding, for example by ball-milling the aqueous suspension or by milling with inorganic salts, or by dissolving in sulphuric acid and adding the acid solution to water or adding water to the acid solution.

The preferred metal compounds are those of chromium, manganese, iron, cobalt, nickel and copper, that is the metals of atomic number between 24 and 29 both inclusive.

The compounds of the above formula wherein the metal is nickel are especially valuable for use as pigments, for example nickel hexadecahydrophthalocyanine (that is to say a nickel compound in which the pairs of carbon atoms not attached to nitrogen in all four of the fundamental pyrrole nuclei form part of cyclohexyl rings) is an especially valuable blue-violet pigment of good fastness properties and high tinctorial strength.

The new compounds may be made by heating with a substance consisting of, or containing a metal, a substituted and/or unsubstituted $\Delta^1$-tetrahydrophthalonitrile or a mixture of $\Delta^1$-tetrahydrophthalonitrile with a phthalonitrile and/or maleic dinitrile and/or a substituted maleic dinitrile, and this forms a further feature of our invention.

In place of the substituted maleic dinitrile, the corresponding fumaric dinitrile may sometimes be used. For example dimethylmaleic dinitrile (melting point 48° C.) and dimethyl fumaric dinitrile (melting point 81° C.) (which may both be obtained by dehydrating the cyanohydrin of α-methylacetoacetonitrile and separating the two isomers by fractional distillation or crystallisation) may both be used. As a possible explanation of this, it is suggested that the substituted fumaric dinitrile is converted to the corresponding maleic dinitrile. If desired a mixture of the substituted fumaric and maleic dinitriles may be used.

The new metal tetra-aza-porphins which do not contain an unsubstituted fundamental pyrrole nucleus are, however, preferably made by heating with urea or a heat decomposition product thereof and a substance consisting of or containing a metal, a substituted or unsubstituted $\Delta^1$-tetrahydrophthalic acid or functional derivative thereof or a mixture of one of these with a second substituted $\Delta^1$-tetrahydrophthalic acid, and/or a phthalic acid and/or a substituted maleic acid or with functional derivatives of any of these acids.

It will be understood that when the free acid is not available, a functional derivative is to be used.

The metal to be used is preferably one with atomic number between 24 and 29 inclusive, especially nickel.

Mixtures of phthalic acids or substituted maleic acids or functional derivatives thereof may be used.

The reaction may be carried out in presence of a catalyst especially a small quantity of a substance consisting of or containing molybdenum or wolfram, for example ammonium molybdate or sodium wolframate, and this forms a preferred feature of our invention.

The reaction is conveniently brought about by heating the reagents together in a medium which is liquid at the temperature of the reaction mixture and this forms a further feature of our invention.

Suitable media are for example nitrobenzene, dichlorobenzene, chloronaphthalene and kerosene.

As metal-containing substances which can be used in place of the metals themselves, there may be mentioned the oxides or salts, for example cobalt chloride, nickel chloride, chromium chloride, ferrous chloride, manganese chloride, cuprous chloride and cupric chloride.

The acid used in the process or functional derivative thereof may if desired be formed in situ in the reaction mixture. As functional derivatives of the acids there may be used the corresponding amide, imide, ammonium salt or dinitrile or there may be used the mononitrile derived from the dibasic acid or the corresponding amide, ammonium salt or ester thereof. In general however it is preferred to use the anhydrides of the acids, for example there may be used $\Delta^1$-tetrahydrophthalic anhydride.

The reaction is generally found to proceed satisfactorily by heating the reagents together for several hours at temperatures as low as 130–150° C. The liquid medium may then be removed by distillation (in steam or under reduced pressure if desired) and the reaction product may be extracted with aqueous acid and/or alkali, washed and dried. The products may be further purified by crystallisation from a suitable solvent for example dichlorobenzene.

The new compounds of our invention may sometimes conveniently be made by heating with the metal or metal compound the corresponding metal-free pigment, which itself may be made by heating the appropriate dinitriles with sodium in amyl alcohol and demetallising the product with methanol.

The invention is illustrated but not limited by the following examples in which the parts are by weight:

*Example 1*

A mixture of 1.52 parts of $\Delta^1$-tetrahydrophthalic anhydride, 6 parts of urea, 0.5 part of anhydrous nickel chloride, 0.2 part of ammonium molybdate and 11 parts of nitrobenzene is heated to 130° C. for 4 hours. 100 parts of 5% hydrochloric acid are added and the mixture is freed from nitrobenzene by steam distillation. The insoluble residue is filtered off and washed free from acid. The material so obtained is stirred with 100 parts of 2% caustic soda at about 90° C. for 10 minutes and the undissolved product is filtered off, washed free from alkali and dried. The crude pigment thus obtained as a navy-blue powder may be further purified by crystallisation from a high-boiling solvent such as o-dichlorobenzene from which it separates as small bronze prism-shaped crystals.

*Example 2*

4.6 parts of $\Delta^1$-tetrahydrophthalic anhydride, 27 parts of urea, 1.5 parts of anhydrous nickel chloride, 0.6 part of ammonium molybdate and 100 parts of nitrobenzene are stirred together for 4 hours at about 150° C., while a slow stream of ammonia is bubbled through the mixture. 300 parts of 5% hydrochloric acid are added, the mixture is freed from nitrobenzene by steam distillation and the insoluble residue filtered off and further purified with 2% caustic soda solution as described in Example 1. The crude pigment thus obtained as a deep blue powder, may be further purified by dissolving it in 60 parts of 100% sulphuric acid and stirring the solution first at 25° C. for 1 hour and then at 90–95° C., for 1 hour. The cooled solution is poured on to 300 parts of crushed ice and the insoluble product is filtered off and washed free from acid. The wet paste thus obtained is stirred with a mixture of 300 parts of water and 5 parts of 30% caustic soda solution at 70° C., for 10 minutes and the insoluble product is filtered off, washed free from alkali and dried, when the new pigment is obtained as a bronze-iridescent deep purple powder.

*Example 3*

A mixture of 3.04 parts of $\Delta^1$-tetrahydrophthalic anhydride, 12.0 parts of urea, 1.8 parts of anhydrous cobaltous chloride, 0.4 part of ammonium molybdate and 24 parts of nitrobenzene is stirred at about 145° C., for 4 hours. The reaction product is worked up as described in Example 1 and the new pigment purified by crystallisation from o-dichlorobenzene.

Example 4

In place of the 1.8 parts of cobaltous chloride used in Example 3, there may be used a mixture of 1 part of cupric chloride and 0.5 part of cuprous chloride.

Example 5

2.5 parts of Δ¹-tetrahydrophthalimide, 10 parts of urea, 1 part of anhydrous nickel chloride, 0.3 part of ammonium molybdate and 60 parts of nitrobenzene are stirred together at about 135° C., for 4 hours. The reaction product is worked up and the new pigment isolated as described in Example 1.

Example 6

A mixture of 3.6 parts of 1-cyano-2-carbethoxy-Δ¹-cyclohexene, 12 parts of urea, 1 part of anhydrous nickel chloride, 0.4 part of ammonium molybdate and 22 parts of nitrobenzene is stirred at 135–40° C. for 4 hours. The resulting product is worked up as in Example 1 and the new pigment purified by crystallisation from o-dichlorobenzene.

Example 7

1.06 parts of Δ¹-tetrahydrophthalonitrile (melting point 94–95° C., which may be obtained by dehydrating the cyanhydrin of 2-cyanocyclohexanone), 1.6 parts of urea, 0.4 part of anhydrous nickel chloride, 0.16 part of ammonium molybdate and 6 parts of nitrobenzene are stirred together at 145° C., for 3½ hours. The reaction product is worked up as described in Example 1 and the crude pigment is obtained as a deep purple powder which may be purified by crystallisation from o-dichlorobenzene.

Example 8

An intimate mixture of 1.32 parts of Δ¹-tetrahydrophthalonitrile, 6 parts of urea, 0.5 part of anhydrous cobaltous chloride and 0.2 part of ammonium molybdate is heated under pressure to 205–210° C., for 3 hours. The black reaction product, which shows a bronzy-purple lustre, is powdered and boiled with 100 parts of 5% hydrochloric acid for 5 minutes and the insoluble matter is filtered off and washed free from acid. The residue is boiled with 100 parts of 2% caustic soda for 5 minutes, then filtered off and washed free from alkali. The dried residue, which forms a deep purple lustrous powder, is crystallised from boiling o-dichlorobenzene when the new pigment separates as a bronzy microcrystalline solid.

Example 9

In place of the 0.5 part of cobaltous chloride used in Example 8, there is used a mixture of 0.5 part of cuprous chloride and 0.25 part of anhydrous cupric chloride.

Example 10

A mixture of 1.98 parts of Δ¹-tetrahydrophthalonitrile, 9 parts of urea, 0.37 part of anhydrous cupric chloride, 0.75 part of cuprous chloride, 0.2 part of ammonium molybdate and 60 parts of nitrobenzene is stirred at about 180° C. for 4 hours while a slow stream of dry ammonia is bubbled through. The reaction product is worked up as described in Example 1 and the new pigment purified by crystallisation from o-dichlorobenzene.

Example 11

1.32 parts of Δ¹-tetrahydrophthalonitrile are added to a cold solution of 0.145 part of sodium in 20 parts of amyl alcohol and the orange-coloured mixture is gently boiled for 1 hour. The colour rapidly changes through dull brown to deep green and finally becomes dull blue. The mixture is cooled and filtered and the residue on the filter is washed with warm amyl alcohol to remove brown impurities and finally with ether to leave a dark blue powder. This sodium compound is stirred with 30 parts of cold methyl alcohol for 1 hour and the solid is then filtered off and washed well with methyl alcohol. The navy-blue pigment so obtained is the metal-free compound and it may be further purified by crystallisation from o-dichlorobenzene and it is then obtained as a purple microcrystalline solid with a bronze lustre.

This metal-free pigment may be converted to the corresponding metal compound by heating it in boiling quinoline with nickel, cobalt or copper acetate.

Example 12

3.04 parts of Δ¹-tetrahydrophthalic anhydride, 2.52 parts of dimethylmaleic anhydride, 24 parts of urea, 2 parts of anhydrous nickel chloride, 0.8 part of ammonium molybdate and 35 parts of nitrobenzene are stirred together at 135–140° C., for 4 hours. The reaction product is then worked up as described in Example 1 and the crude pigment is purified by crystallisation from boiling benzene or boiling monochlorobenzene from which it separates as a bronzy, crystalline solid.

Example 13

In place of the 2.52 parts of dimethylmaleic anhydride used in Example 12, there are used 2.96 parts of phthalic anhydride. The crude pigment is purified by crystallisation from boiling o-dichlorobenzene and obtained as a microcrystalline powder.

What I claim is:
1. As coloring matters, metal-containing and metal-free tetra-aza-porphin derivatives of the formula:

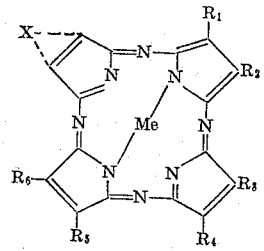

wherein Me is selected from the group consisting of a pair of hydrogen atoms and a metal having an atomic number of from 24 to 29, both inclusive; wherein X represents the atoms necessary to complete a 6-membered alicyclic ring; and wherein, of the radicals $R_1$ to $R_6$, from 0 to 3 of the pairs of these radicals which are attached to adjacent carbon atoms on the same ring are joined together to form a cyclic ring selected from the group consisting of alicyclic, arylene and quinonoid, and the remainder of the radicals $R_1$ to $R_6$ being radicals selected from the group consisting of hydrogen and lower alkyl.

2. The coloring matters of claim 1, wherein X represents the atoms necessary to complete a cyclohexyl radical.

3. As coloring matters, the tetra-aza-porphin derivatives of claim 1, wherein the metal is nickel.

4. Nickel hexadecahydrophthalocyanine.

5. A process for the manufacture of the metal-containing tetra-aza-porphin derivatives described in claim 1, which comprises heating, at a temperature of at least 130° C., a $\Delta^1$-tetrahydrophthalonitrile with a substance comprising a metal having an atomic number of from 24 to 29, both inclusive.

6. The process of claim 5, wherein a mixture of the $\Delta^1$-tetrahydrophthalonitrile with at least one nitrile selected from the group consisting of phthalonitriles, maleic dinitriles and fumaric dinitriles is heated with the metal-containing substance.

7. A process for the manufacture of coloring matters which comprises heating, at a temperature of at least 130° C., the metal-free tetra-aza-porphin derivatives described in claim 1 with a substance comprising a metal having an atomic number of from 24 to 29, both inclusive.

8. A process for the manufacture of coloring matter which comprises heating, at a temperature of at least 130° C. and with urea and a substance comprising a metal having an atomic number of from 24 to 29, both inclusive, a compound selected from the group consisting of the $\Delta^1$-tetrahydrophthalic acids, and the anhydrides, amides, imides, nitriles and ammonium salts thereof.

9. The process of claim 8, wherein the reaction mixture contains a minor quantity of a substance comprised of a member selected from the group consisting of molybdenum and wolfram.

References Cited in the file of this patent

FOREIGN PATENTS

| Number | Country | Date |
|---|---|---|
| 215,404 | Switzerland | Sept. 16, 1941 |

OTHER REFERENCES

Cook et al.: Journal Chemical Society (London), 1937, pp. 929–933.

Haddock: Jr. Soc. Dyers and Colourist, March 1945, pp. 68–73.